United States Patent
Sudarsky et al.

(10) Patent No.: US 8,300,047 B2
(45) Date of Patent: Oct. 30, 2012

(54) SYSTEM AND METHOD FOR COLON UNFOLDING VIA SKELETAL SUBSPACE DEFORMATION

(75) Inventors: Sandra Sudarsky, Bedminster, NJ (US); Bernhard Geiger, Cranbury, NJ (US); Christophe Chefd'hotel, Jersey City, NJ (US); Lutz Gündel, Erlangen (DE); Michael Scheuering, Nürnberg (DE)

(73) Assignee: Siemens Aktiengesellschaft, München (DE)

( * ) Notice: Subject to any disclaimer, the term of this patent is extended or adjusted under 35 U.S.C. 154(b) by 909 days.

(21) Appl. No.: 12/398,220

(22) Filed: Mar. 5, 2009

(65) Prior Publication Data

US 2009/0225077 A1    Sep. 10, 2009

Related U.S. Application Data

(60) Provisional application No. 61/035,173, filed on Mar. 10, 2008.

(51) Int. Cl.
*G06T 15/00* (2011.01)
(52) U.S. Cl. ......... 345/423; 345/419; 345/428; 345/441
(58) Field of Classification Search .................. 345/419, 345/423, 441, 426, 428
See application file for complete search history.

(56) References Cited

PUBLICATIONS

Li et al, Colon Straightening Based on a Gravity Field Model, IEEE Computer, 2009, pp. 3621-3624.*
Yao et al, Reversible Projection technique for Colon Unfolding, IEEE transaction on Biomedical Engineering, Dec. 2010, pp. 2861-2869.*
Unwinding the Colon, Silver, D.. Gagvani, N.; Medicine Meets Virtual Reality (MMVR) 2002.
Colon Unfolding Via Skeletal Subspace Deformation by: Sandra Sudarsky, Bernhard Geiger, Christophe Chefd'hotel, Lutz Guendel; Medical Image Computing and Computer-Assisted Intervention—MICCAI 2008, pp. 205-212.
NonLinear Virtual Colon Unfolding, Bartroli, A., Wegenkittl, R., König, A., Gröller, E., Proc. IEEE Visualization, pp. 411:420 (2001).
GI tract unraveling with curved cross sections, Wang. G., McFarland. E., Brown, B.. Vannier, M.; IEEE Transactions on Medical Imaging, vol. 17, No. 2, Apr. 1998.
Realistic Skeleton Driven Skin Deformation, Yang, X. and Zhang, J.; Lecture Notes in Computer Science (TSCG 2005), Springer-Verlag, May 2005.

* cited by examiner

*Primary Examiner* — Phu K Nguyen
(74) *Attorney, Agent, or Firm* — Donald B. Paschburg; F. Chau & Associates, LLC

(57) ABSTRACT

A system and method for colon unfolding via skeletal subspace deformation comprises: performing a centerline computation on a segmented image for deriving a centerline thereof; computing a distance map utilizing said centerline and said segmented image to derive said distance map; generating a polyhedral model of the lumen of said colon; and utilizing said polyhedral model, said distance map, and said centerline for performing a straightening operation on said centerline.

19 Claims, 12 Drawing Sheets

SYSTEM AND METHOD FOR COLON UNFOLDING VIA SKELETAL SUBSPACE DEFORMATION

CROSS-REFERENCE TO RELATED APPLICATION AND CLAIM OF PRIORITY

Specific reference is hereby made to copending U.S. Provisional Patent Application No. 61/035,173, filed Mar. 10, 2008 in the names of inventors Sandra Sudarsky, Bernhard Geiger, Christophe Chefd'hotel, Lutz Guendel, and Michael Scheuering and entitled "Colon Dissection View", and which is hereby incorporated herein by reference and whereof the benefit of priority is claimed.

FIELD OF THE INVENTION

The present invention relates generally to the field of imaging apparatus and more particularly to facilitating the unfolding or surface development of generally tubular structures such as, by way of example, the colon and other generally tubular anatomical organs.

BACKGROUND OF THE INVENTION

Virtual colonoscopy is a non-invasive screening procedure aimed at exploring the inner colonic surface, typically in a search for lesions. Standard methods in virtual colonoscopy generally try to simulate conventional colonoscopy techniques by using "virtual fly-throughs" of the reconstructed colon image. Major problems associated with such techniques include the time required to navigate through the complex colon shape and the number of areas that are often inadvertently left uninspected as they remain occluded behind Haustral folds. A number of techniques have been proposed to alleviate these problems, including utilizing Mercator projections (see, for example, Paik, D., Beaulieu, C, Jeffrey, R. C. A., Karadi, C, S., Napel, S., "Visualization modes for CT colonography using Cylindrical and planar map projections", J. Comput Assist. Tomogr. vol. 24(2), pp. 179-188 (2000)); an unfolded cube display (see, for example, Vos, F., Serlie, I., van Gelder, R., Post, F. Truyen, R., Gerritsen, F., Stoker, J., Vossepoel, A., A New Visualization Method for Virtual Colonoscopy, MICCAI 2001: 645-654, (2001)); and panoramic projections (see, for example, Geiger, B., Chefd'hotel, C, Sudarsky, S., Panoramic Views for Virtual Endoscopy, Duncan, J, Gerig, G. (eds), MICCAI 2005, LNCS 3749, 662-669, Springer-Verlag, (2005)).

Recently, an alternative approach has emerged in the literature which proposes the use of virtual dissection of the colonic surface to speed up the inspection process. With this technique, the 3D model of the colon is cut open longitudinally and displayed as a single flat image. This approach has the potential of decreasing the inspection time and at the same time reducing the number of blind areas. However, it is well known that the colon lumen cannot be flattened onto a plane without introducing some deformations. See Johnson K., Johnson C., Fletcher, J., MacCarty, R., Summers, R., CT colonography using 360-degree virtual dissection: a feasibility study. AJR Am J Roentgenol; 186:90-95, (2006).

A number of methods have been proposed to digitally straighten and unfold the colon to expose the entire colon lumen as a single image. A uniform sampling technique using planar cross sections orthogonal to the centerline is proposed in Wang, G, Vannier, M., Unraveling the GI tract by spiral CT, SPIE 1995, 307-315. (1995).

The results appear to be acceptable for portions of the colon that are fairly linear, but produce undesirable results in high curvature areas. This straightforward sampling can lead to single lesions being displayed more than once or missed completely. To overcome these limitations, a method has been proposed for transforming the colon into a straight cylinder-like shape based on the characteristics of the electrical field of a charged centerline. See Wang. G. McFarland. E., Brown, B. Vannier, M., GI tract unraveling with curved cross sections; IEEE Transactions on Medical Imaging, vol. 17, no. 2, April 1998, hereby incorporated herein by reference.

When the entire centerline is charged, the curved cross-sectional planes generated tend to diverge, thereby avoiding the double sampling problem. However, since the method is so computationally expensive, the path is changed only locally and therefore there is no guarantee that the cross sections will not intersect. The method is computational expensive requiring in the order of 6 hours of computational time, according to Zhang in the paper cited below, by X. Zhang and J. Yang.

A method to map the entire colon surface onto a flat surface using a conformal mapping is proposed in Haker, S., Angenent, S., Tannenbaum, A., Kikinis, R., "Nondistorting Flattening for Virtual Colonoscopy", Proc. MICCAI 2000, 358-366, (2000). It is based on a discretization of the Laplace-Beltrami operator for flattening a surface onto a plane in a manner that preserves local geometry. The flattened surface is then color-coded based on the mean curvature.

Bartroli et al. propose a new approach to deal with the problems of double appearance of lesions and non-uniform sampling. Their technique works by casting rays that follow the negative gradient direction of a distance map generated from the centerline. These rays are curved and do not intersect. The distance between the ray origins and the hit surface point determine a height field. The height field is then unfolded and a non linear scaling is applied to compensate for distortions introduced by the non uniform sampling. The computational time for the entire process is in the range of hours. See Bartroli, A. Wegenkittl, R. König, A., Gröller, E., "NonLinear Virtual Colon Unfolding". Proc. IEEE Visualization, 411:420 (2001), hereby incorporated herein by reference.

Silver et al. propose an algorithm to manipulate volumetric datasets using volumetric skeletons. The authors use the term skeleton to refer to a thinned volume that retains the essential shape of the original volume and it is computed using a reversible thinning procedure based on a distance transform. The skeleton can be interactively manipulated and the deformed volume reconstructed via an inverse transformation. See Silver, D. Gagvani, N. Unwinding the Colon, Medicine Meets Virtual Reality (MMVR) 2002, hereby incorporated herein by reference.

In the work of Zhang et al., the colon straightening is modeled as a solid elastic deformation process with special constraints and boundary conditions. The deformation model is described by a group of partial differential equations based on equilibrium and kinematic equations found in solid mechanics theory. See Zhang, Z., Ackerman M., Li, J. "Colon straightening based on an elastic mechanics model", ISBF04, IEEE, 292-295, (2004).

Hong et al. present an algorithm that flattens the colon in a conformal manner and minimizes the global distortion. The conformal parameterization is solved using finite element methods to approximate a solution of an elliptic partial differential equation on surfaces. The entire process takes about 30 minutes for a 512×512×460 data set. See Hong, W., Gu. X., Qiu, F., Jin, M., Kaufman. A, "Conformal Virtual Colon Flattening", SPM 2006, Cardiff Wales. 85-93 (2006).

Also of interest in this context are Lim, S. Lee, H., Shin B. "Surface Reconstruction for Efficient Colon Unfolding", Kim M. Shimada, K., (eds.). GMP 2006. LNCS 4077. 623-629. Springer-Verlarg (2006); and Gibson, S., Calculating the Distance Map for Binary Sampled Data, Technical Report TR99-26, Mitsubishi, 1999

SUMMARY OF THE INVENTION

In accordance with an aspect of the invention, a method for colon image unfolding via skeletal subspace deformation comprises: performing a centerline computation on a segmented image for deriving a centerline thereof; computing a distance map utilizing the centerline and the segmented image to compute the distance map; generating a polyhedral model of the lumen of the colon; and utilizing the polyhedral model, the distance map, and the centerline for performing a straightening operation on the centerline.

In accordance with another aspect of the invention, a method for colon image unfolding via skeletal subspace deformation includes a step of performing a dissection image computation following the straightening operation for deriving a texture image.

In accordance with another aspect of the invention, the step of performing a centerline computation on a segmented image comprises a step of deriving a centerline path representing the centerline of the colon.

In accordance with another aspect of the invention, a method for colon image unfolding via skeletal subspace deformation includes a step of defining the centerline path as a sequence of joints, wherein any two consecutive joints define a centerline link segment therebetween and wherein each centerline link segment has a respective associated coordinate system of orthogonal x, y, and z axes, wherein each respective z axis at any particular point is oriented to align with a tangent of the centerline path at that particular point.

In accordance with another aspect of the invention, the step of deriving a centerline path comprises utilizing a region growing algorithm starting at a wall of the colon.

In accordance with another aspect of the invention, the step of generating a polyhedral model comprises generating a polyhedral mesh model of the surface of the colon based on a given threshold value, the polyhedral model comprising a plurality of triangles with vertices, designated as $v_i \ldots v_p$; and a step of computing an adjacency list for each of the vertices.

In accordance with another aspect of the invention, the step of generating a polyhedral mesh model comprises a smoothing step; and the smoothing step comprises traversing each adjacency list and computing an adjacency list for each of the vertices.

In accordance with another aspect of the invention, the smoothing step comprises traversing each adjacency list and adjusting coordinates of the vertices for generating a smooth polyhedral mesh model.

In accordance with another aspect of the invention, the step of generating a polyhedral mesh model comprises using a marching cubes algorithm.

In accordance with another aspect of the invention, the step of computing a distance map comprises using a region growing technique based on the pseudo Euclidean distance transform wherein points that define the centerline are used as seed points.

In accordance with another aspect of the invention, a method includes associating each of the vertices $v_i$ with its respective closest point $c_k$ on the centerline path as defined by the distance map; and iterating through the adjacency list a plural number of times and each time reassigning for each vertex a new point on the centerline path that corresponds to the preceding average of its neighbors.

In accordance with another aspect of the invention, the method includes associating each of the vertices $v_i$ with its respective closest point $c_k$ on the centerline path as defined by the distance map; and a smoothing step comprising, for each of the vertices $v_i$, averaging its nearest centerline point index k with indices of its adjacent vertices using a plurality of iterations, such that each vertex $v_i$ is associated with a neighborhood of centerline points distributed around its respective closest point $c_k$ on the centerline path, with weights inversely proportional to distance between the vertex $v_i$ and centerline points $c_j$ in the neighborhood.

In accordance with another aspect of the invention, the method includes aligning each centerline segment with respect to its preceding segment to form a straight line therewith by a series of transformations of the respective associated coordinate system of each centerline segment to a new respective associated coordinate system; and recomputing coordinates for the vertices based on the transformations.

In accordance with another aspect of the invention, the method includes a step of performing dissection computation for providing a texture image of a specified size having a given number of columns by a given number of rows*a given number of stripes: and wherein the step of performing dissection computation comprises partitioning the straightened colon into a plurality of similar length sections.

In accordance with another aspect of the invention, a method includes a step of casting, from discrete points along the centerline path, a plurality of rays orthogonal to the centerline path and calculating the intersection of respective rays with the polyhedron, wherein the number of the discrete points corresponds to the number of columns in the texture image.

In accordance with another aspect of the invention, a method includes a step of deriving an estimated colon diameter at each of the discrete points and utilizing the estimated diameter to scale the unfolding at each column.

In accordance with another aspect of the invention, a method includes a step of casting a new set of rays orthogonal to the centerline path and uniformly distributed covering an angle in excess of 360 degrees, such that a resulting texture image exhibits an overlap at its edges.

In accordance with another aspect of the invention, a method includes a step of utilizing properties of the material being imaged and the effect of scene lighting, and calculating shading for each corresponding pixel of the texture image.

In accordance with another aspect of the invention, a system for performing colon unfolding via skeletal subspace deformation comprises a memory device for storing a program and other data; and a processor in communication with said memory device, said processor being operative with said program to perform: performing a centerline computation on a segmented image for deriving a centerline thereof; computing a distance map utilizing the centerline and the segmented image to derive the distance map; generating a polyhedral model of the lumen of the colon; and utilizing the polyhedral model, the distance map, and the centerline for performing a straightening operation on the centerline.

In accordance with another aspect of the invention, a computer program product comprises a computer useable medium having computer program logic recorded thereon for program code for performing colon unfolding via skeletal subspace deformation by: performing a centerline computation on a segmented image for deriving a centerline thereof;

computing a distance map utilizing the centerline and the segmented image to derive the distance map; generating a polyhedral model of the lumen of the colon; and utilizing the polyhedral model, the distance map, and the centerline for performing a straightening operation on the centerline.

A system and method for colon unfolding via skeletal subspace deformation comprises: performing a centerline computation on a segmented image for deriving a centerline thereof; computing a distance map utilizing the centerline and the segmented image to derive the distance map; generating a polyhedral model of the lumen of the colon; and utilizing the polyhedral model, the distance map, and the centerline for performing a straightening operation on the centerline.

A method for colon unfolding via skeletal subspace deformation comprises: performing a centerline computation on a segmented image for deriving a centerline thereof; computing a distance map utilizing the centerline and the segmented image to derive a distance map; deriving a polyhedral model from the distance map; and utilizing the polyhedral model, the distance map, and the centerline for performing a straightening operation on the centerline; and performing a dissection image computation following said straightening operation for deriving a texture image.

BRIEF DESCRIPTION OF THE DRAWING

The invention will be more fully understood from the following detailed description, in conjunction with the drawing, in which.

DETAILED DESCRIPTION OF THE INVENTION

It is an object of the present invention to provide a system and method for digitally straightening a colon image in a manner significantly faster than prior techniques. Typically, in accordance with the principles of the present invention, a complete unfolding can be generated in under two minutes.

Figure 1:
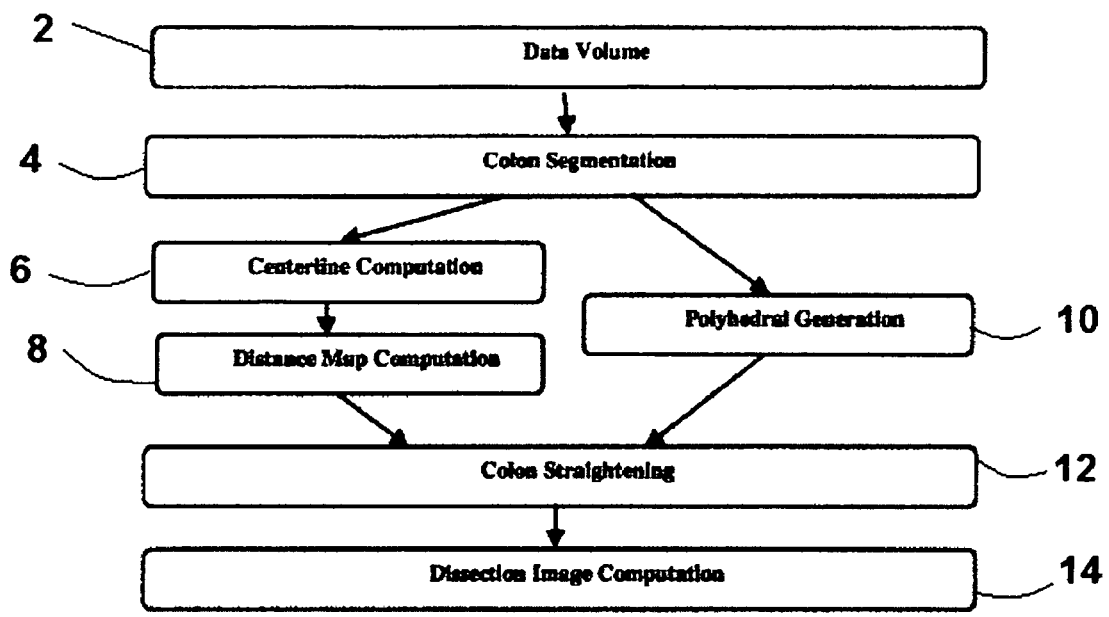
FIG. 1 shows in block schematic form steps of the virtual dissection process in accordance with principles of the invention.

There follows a description in detail of an algorithm in conjunction with exemplary embodiments in accordance with the present invention, generally following the outline shown in FIG. 1. In the block schematic of FIG. 1, given a CT data volume 2, we compute a fully automated colon segmentation based on a threshold region growing operation, at step 4. Centerline computation of the colon is performed in step 6, followed by a distance map computation in step 8. In a parallel path following colon segmentation in step 4, a polyhedral generation is performed in step 10. The results of steps 8 and 10 are utilized in step 12 for carrying out colon straightening, and in step 14 dissection image computation is performed.

Segmentation in organ imaging for identifying and displaying specific structures in volume data sets is an established field in which numerous well-known techniques are utilized. Detailed descriptions of the principles involved and a number of such techniques are available in standard textbooks and numerous journal articles. For further detail, reference is hereby made for incorporation of applicable teachings under segmentation in, for example, A. R. Weeks, Jr., Fundamentals of Image Processing, (Chapter 8), SPIE/IEEE Series on Imaging Science & Engineering, 1996; R. C. Gonzalez and R. E. Woods, Digital Image Processing, Prentice-Hall, Inc., second edition 2002.; T. S. Yoo, Insight into Images, A. K. Peters, Wellesley, Mass., 2004; M. Sonka, V. Hlavac, R. Boyle, Image Processing, Analysis, and Machine Vision, Brooks/Cole Publishing Company, second edition 999; P. Rogalla et al., Editors, Virtual Endoscopy and Related 3D Topics, Springer-Verlag, 2002.

Centerline computation (step 6 in FIG. 1) as generally performed for the colon and like structures is described in various publications. See for example, the following patents, herein incorporated by reference: U.S. Pat. No. 7,081,088 entitled METHOD AND APPARATUS FOR AUTOMATIC LOCAL PATH PLANNING FOR VIRTUAL COLONOSCOPY 2003P01245US, Inventor Bernhard Geiger; U.S. Pat. No. 7,457,444 entitled METHOD AND APPARATUS FOR FAST AUTOMATIC CENTERLINE EXTRACTION FOR VIRTUAL ENDOSCOPY, Inventor: Bernhard Geiger et al.; and U.S. Pat. No. 7,300,398, entitled METHOD AND APPARATUS FOR REGISTRATION OF VIRTUAL ENDOSCOPIC IMAGES, Inventors: Christophe Chefd'hotel et al.

Once the centerline has been calculated, a distance map is computed (step 8 of FIG. 1) which encodes for each voxel on the colon wall, the nearest centerline point. The distance map is computed using a region growing technique based on the pseudo Euclidean distance transform where the points that define the centerline are used as the seed points.

In order to define these weights, a distance map is computed at step 8 which encodes for each voxel on the colon wall its nearest centerline point. The distance map is computed at step 8 using a region growing technique based on the semi-Euclidean distance transform where the points that define the centerline are used as the seed points. See 14 Gibson, S., Calculating the Distance Map for Binary Sampled Data, Technical Report TR99-26, Mitsubishi, 1999.

Using a marching cube algorithm, a polyhedral model of the colon surface is generated (step 10 in FIG. 1), based on a given threshold value. To speed up the computation, this step has been parallelized in the present embodiment. Once the polyhedron is computed, we generate the adjacency list for each of its vertices. The last step of the polyhedron model generation comprises a smoothing step, wherein each adjacency list is traversed and the vertices' coordinates are adjusted to generate a smoother mesh. Currently, the smoothing step is repeated 20 times. The resulting mesh comprises a set of triangles with vertices $\{v_1 \ldots v_p\}$.

Material on marching cube techniques can be found in text-books such as, for example, the afore-cited "Insight Into Images," editor Terry S. Yoo, published by A K Peters, Wellesley, Mass.; 2004 and "Virtual Endoscopy and Related 3D Techniques," P. Rogalla et al., editors, published by Springer; 2002.

The next step is that of colon straightening (step 12 in FIG. 1).

The present invention makes use of a technique known as mesh skinning, often used in computer animation to deform a polygonal mesh attached to a skeleton hierarchy, as has been referred to above in another context.

A known technique is used in computer animation to deform polygonal meshes such as the skin affixed to an articulated figure. In accordance with principles of the present invention, a technique, analogous in certain respects to the computer animation technique, is utilized to straighten the colon, in its virtual image form, using the previously calculated centerline as the "skeleton" and the previously derived polyhedral mesh that defines the colon lumen as the "skin". Reference is made to the paper cited below, by X., Zhang and J., Yang et for helpful background material on the skinning technique, as a tool for skin deformations controlled only by transformations applied to the joints of a skeleton. Reference is also made to the paper cited in the next paragraph by Lewis, J., Cordner, M. Fong. N., entitled "Pose Space Deformations: A Unified Approach to Shape Interpolation and Skeleton-Driven Deformation'"

An efficient virtual dissection technique based on mesh skinning is herein described in accordance with the teaching of the present invention utilizing colon unfolding via skeletal subspace deformation. The present invention provides an efficient method in virtual imaging to digitally straighten a colon volume using a technique of mesh skinning; the present technique is, in certain respects analogous to techniques known in computer graphics to deform a polygonal mesh attached to a skeleton hierarchy, such as has been utilized for certain computer animation techniques. See 1. Lewis, J., Cordner, M. Fong. N., "Pose Space Deformations: A Unified Approach to Shape Interpolation and Skeleton-Driven Deformation", and, in the Proceedings of ACM SIGGRAPH2000, Computer Graphics Proceedings, Annual Conference Series. 165-172; and 2. Yang, X. and Zhang, J., "Realistic Skeleton Driven Skin Deformation", Lecture Notes in Computer Science (TSCG 2005), Springer-Verlag, May (2005), hereby incorporated herein by reference.

In accordance with principles of the present invention, the colon centerline is used as a "skeleton structure" and the polyhedral model of the lumen as a "skin" that is to be deformed as the centerline is straightened. Once the colon has been straightened, standard rendering techniques are utilized to compute the virtual dissection. The present invention provides an efficient means for achieving the desired objectives.

Figure 2:
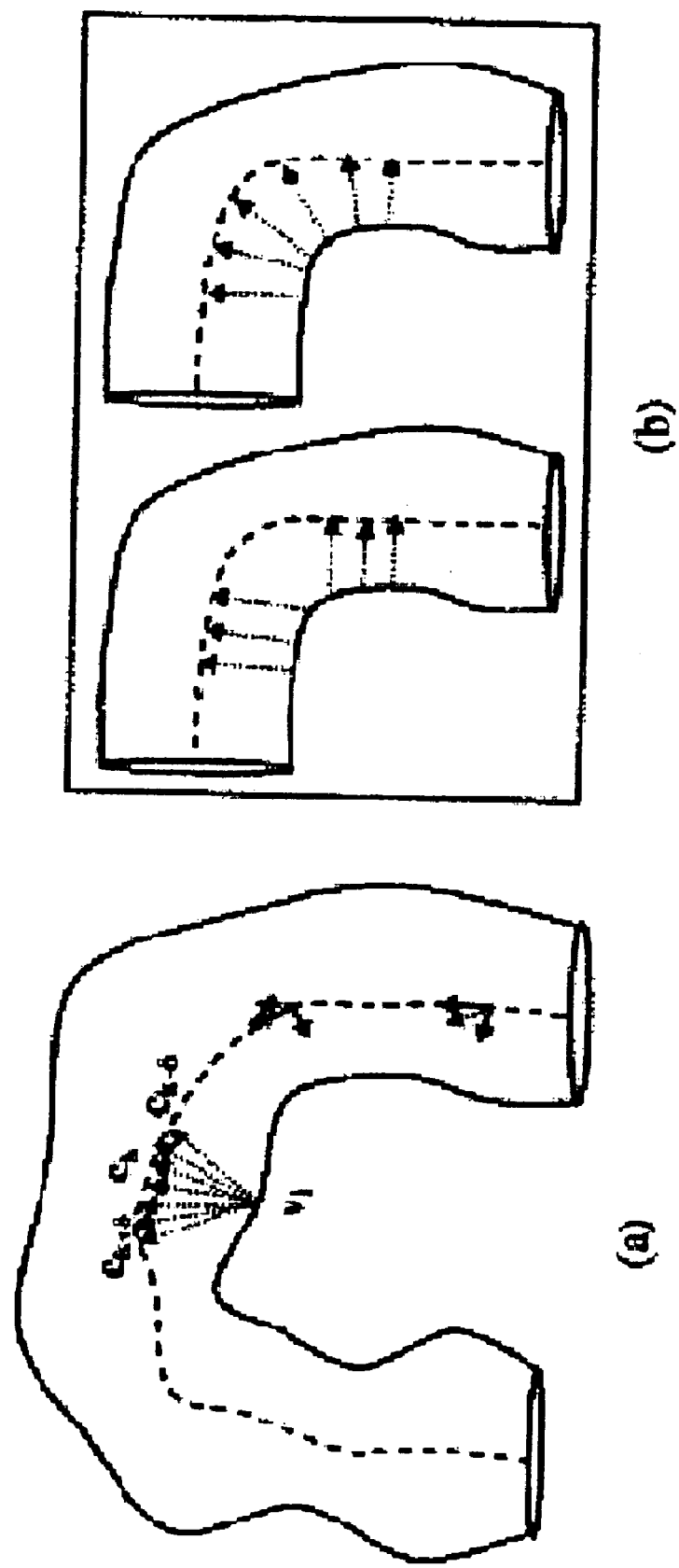
FIG. 2, in diagrammatic form, shows in FIG. 2A centerline segments with corresponding coordinate systems in accordance with principles of the invention, and shows in FIG. 2B nearest centerline points before and after applying a smoothing step in accordance with principles of the invention.

Colon unfolding via skeletal subspace deformation is next considered in more detail. For the present purposes, the centerline is defined as a sequence of points or joints. In the present exemplary implementation, we resample the centerline finely so that two consecutive points are exactly 0.3 distant apart in world coordinates. Two consecutive joints on the centerline define a centerline link segment. FIG. 2a shows centerline segments with corresponding coordinate systems. The nearest centerline point $c_k$ to vertex $v_i$ is associated with vertex $v_i$ via a distance mapping.

The centerline, represented herein as a sequence of "joints" or points $\{c_1 \ldots c_n\}$, is computed in step 6 of FIG. 1 for all components in the threshold volume. See FIG. 2a. As mentioned above, various methods for computing such a centerline are known in the art. Two consecutive centerline points define a "bone" or a link segment. As shown in FIG. 2a, each centerline link has an associated local coordinate system with orthogonal axes x, y, z, relative to the coordinate frame of the previous link, where the z axis is oriented to line up with its corresponding bone. Each link segment corresponds to a transformation matrix $M_{i,\,i-1}$ which describes the position and orientation of link i with respect to the neighboring link i−1.

The straightening of the colon comprises three basic steps. The first step calculates weights Wij that define how much influence a particular bone j has on a vertex $v_i$ of the polyhedron during the deformation process. To ensure a smooth skinning, each vertex in the mesh is associated with multiple joints. The spread of this association in the number of links it will influence is represented by a parameter δ that can be varied in accordance with different requirements for particular structures. In order to define these weights, a distance map is computed at step 8 in FIG. 1 which encodes for each voxel on the colon wall its nearest centerline point. The distance map is computed at step 8 using a region growing technique based on the semi-Euclidean distance transform where the points that define the centerline are used as the seed points. See 14 Gibson, S., Calculating the Distance Map for Binary Sampled Data, Technical Report TR99-26, Mitsubishi, 1999.

Based on this map, each vertex v, of the polyhedral model is associated with its nearest point q on the centerline (see FIG. 2a). Adjacent vertices on the polyhedron should have associated points on the centerline that are near each other. Because of the complicated structure of the colon, this is not always the case and could create severe distortion. To ensure a proper unfolding, we add a smoothing step (see FIG. 2b). For each vertex r, in the mesh, we average its nearest centerline point index k with the indices of its adjacent vertices using several iterations. FIG. 2b shows nearest centerline points before and after applying a smoothing step.

Each polyhedron vertex v, is now associated to a neighborhood of size 2*δ of centerline points symmetrically distributed around $c_k$ (see FIG. 2a) with weights $v_{i,j}$, inversely proportional to the distances $d_{i,j}$ between the vertex $v_i$ and the centerline points $c_j$ in that neighborhood, namely $$w_{i,j} = \frac{1}{d_{i,j}} * \frac{1}{T_i} \quad (1)$$

where $T_i$ is the total sum of all those distances in the defined neighborhood $$T_i = \sum_{j=k-\delta}^{j=k+\delta} \frac{1}{d_{i,j}} \quad (2)$$

It is noted that to ensure that no undesired scaling will occur this weight assignment satisfies equation (3):

$$\sum_{j=k-\delta}^{j=k+\delta} w_{i,j} = 1 \quad (3)$$

Figure 3:
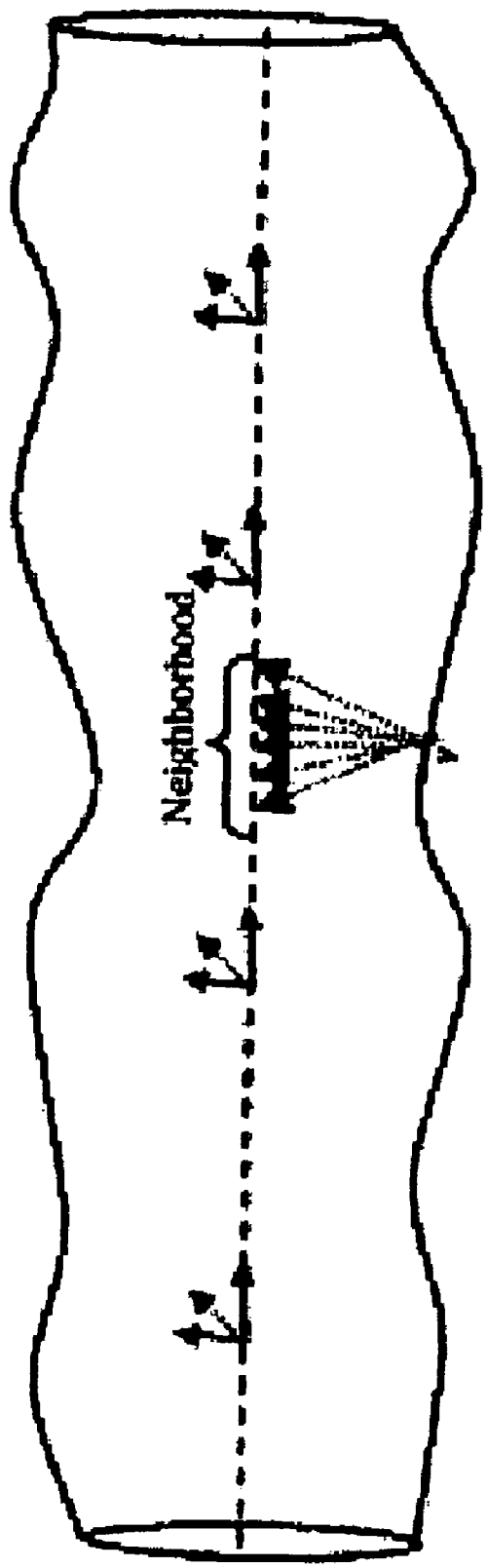
FIG. 3 shows in diagrammatic form operations of straightening the colon in accordance with principles of the invention.

In the second step, each centerline segment is aligned with respect to the previous segment to form a straight line, as shown in FIG. 3. This corresponds to a series of transformations of each segment coordinate system to a new coordinate system.

Matrices $M_j$ are calculated that define the transformation of link i−1 into link i. The final step comprises recomputing the polyhedral vertex coordinates based on the above transformations. The new value v' of $v_i$, is generated by a weighted average of all those transformations.

$$v' = \sum_{j=k-\delta}^{j=k+\delta} w_{i,j}(p_j + M^{-1}(v_i - c_j)) \quad (4)$$

where $m_i$ is the original vertex $v_i$ described in the coordinate system $M_j$; and $M_j$ is the transformation matrix turning segment j−1 into segment j, and $w_{ij}$ is the weight associated with joint j and where $p_j$ are the coordinates of the straight centerline along the z axis.

See also the publication Colon Unfolding Via Skeletal Subspace Deformation by: Sandra Sudarsky, Bernhard Geiger, Christophe Chefd'hotel, Lutz Guendel; Medical Image Computing and Computer-Assisted Intervention—MICCAI 2008 (2008), pp. 205-212 and which is hereby incorporated herein by reference.

Dissection is done in two passes—first a low resolution sampling pass to calculate the diameters and calculate the scaling, and then a high-resolution pass to calculate the unfolded image.

Figure 4:
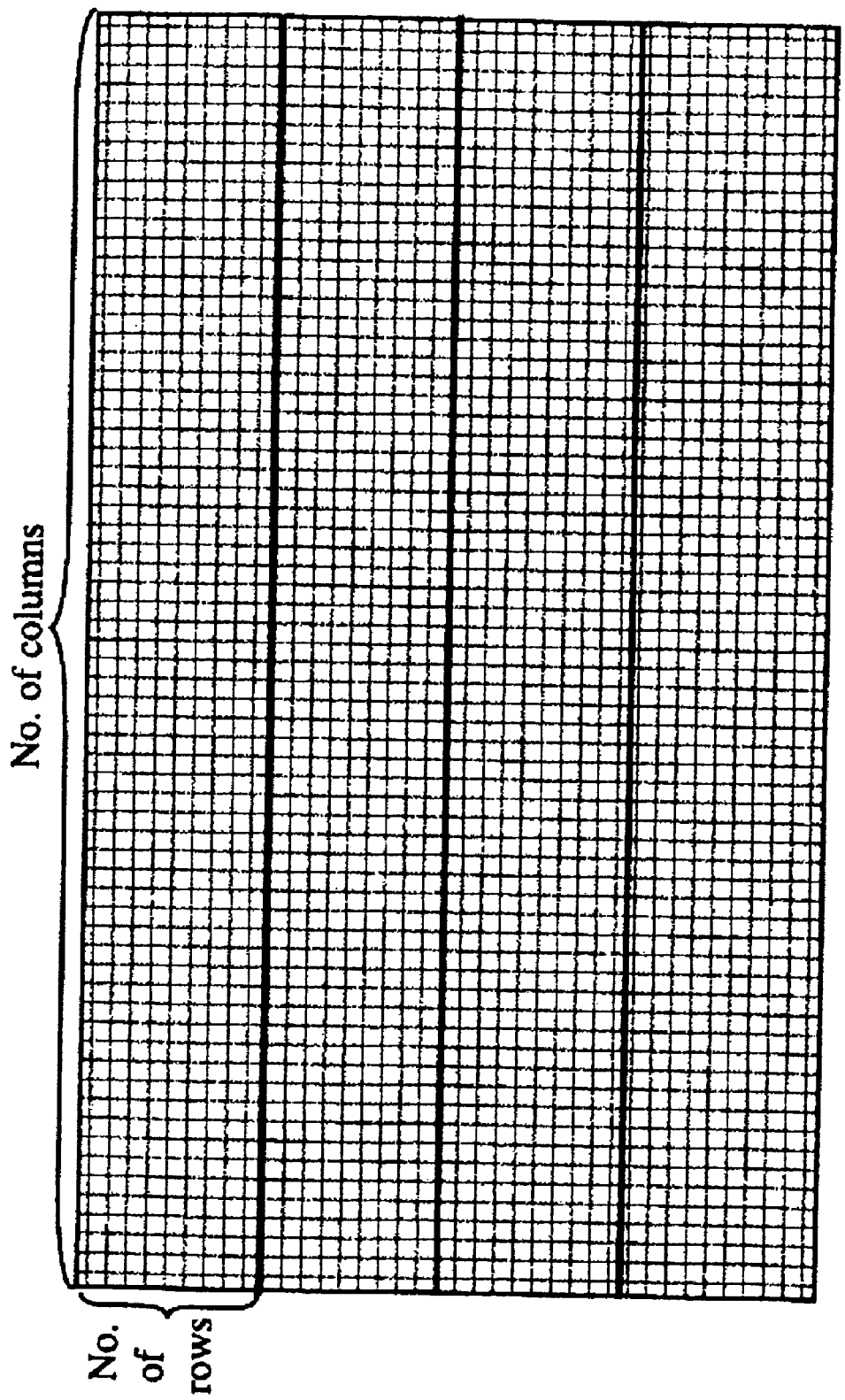
FIG. 4 shows in diagrammatic form a texture image in accordance with principles of the invention.

As shown in FIG. 4, the output of this step is a texture image of size number of columns by number of rows*number of stripes.

At discrete points along the centerline, starting at the rectum and moving toward the cecum, a few sample rays orthogonal to the central path are cast and the intersection of the rays with the polyhedron is calculated. The diameters are calculated in the previous step also as an aid to determining approximately the number of rays to be cast. During this step a height field is computed which stores the distance between the ray origin and the hit surface. This distance corresponds to the radius of the colon and it is used to scale the unfolding.

Figure 5:
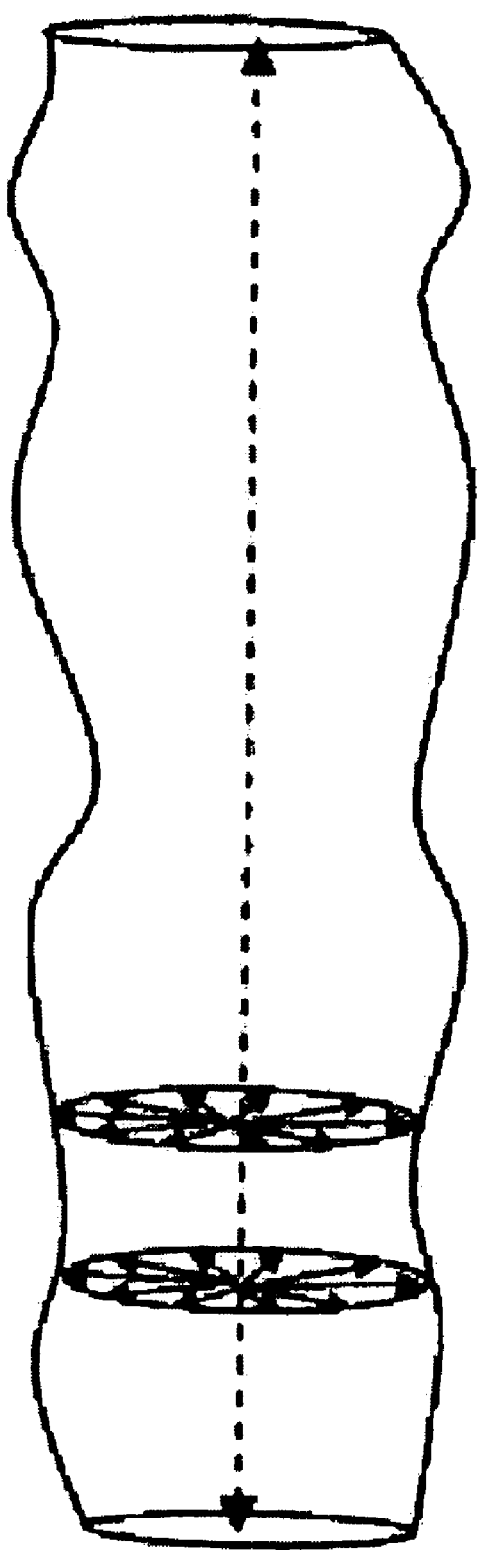
FIG. 5 shows in diagrammatic form a dissection computation in accordance with principles of the invention.

Once the diameters are calculated, a new set of rays are cast. These rays are again orthogonal to the central path and distributed uniformly covering more than 360"; see FIG. 5. Using the material properties and the effect of the lights in the scene, the shading of the corresponding pixel is determined (Phong shading). Because the rays cover more than 360", the resulting image displays an overlap at the edges.

To speed up the intersection calculation between the rays and the mesh, the triangles are sorted relative to the minimum z-component of their vertex coordinates. The dissection view computation can be displayed in a multi-resolution setting. During the initial pass, a low resolution image is generated. The subsequent passes update the image to increase the resolution.

Results of the dissection view computation are illustrated in the figures following.

Figure 6:
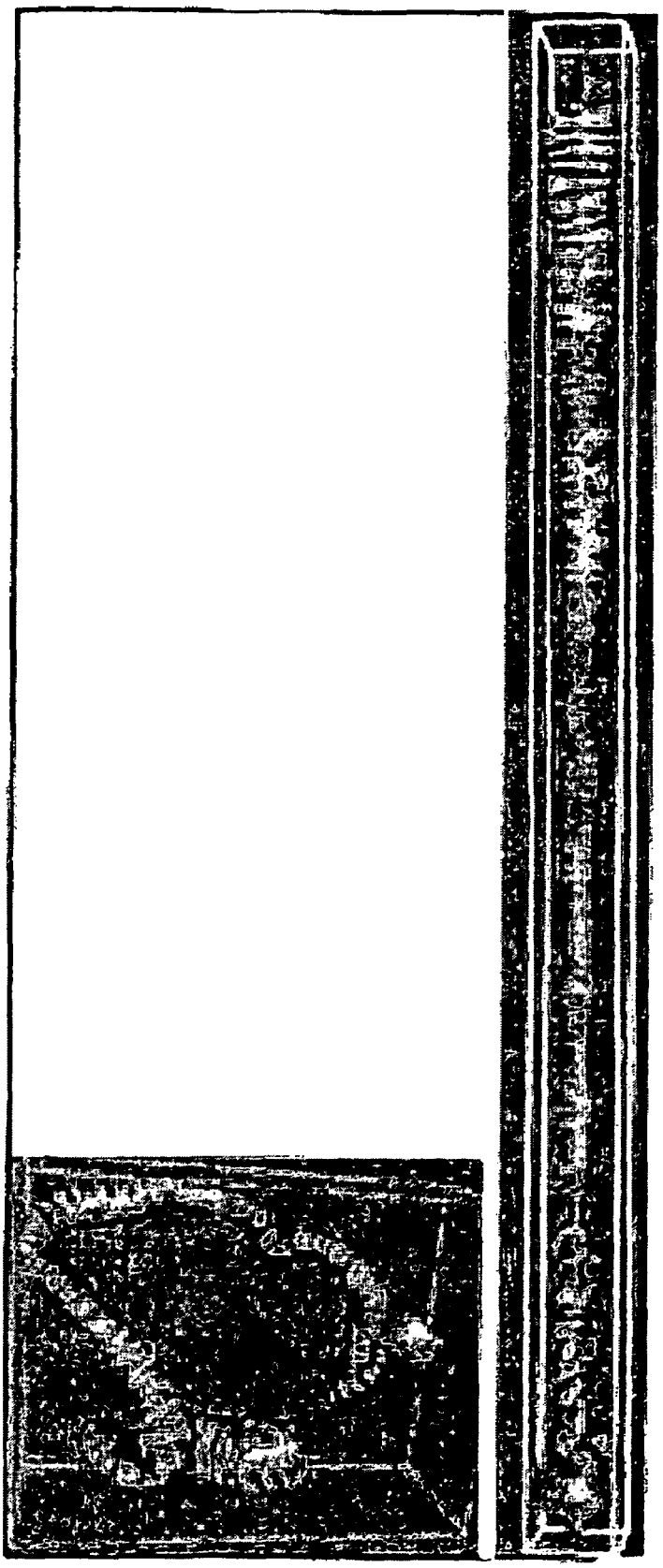
FIG. 6 shows in its upper left corner an original colon segmentation and across the lower part of the figure the result of straightening the centerline in accordance with principles of the invention.

FIG. 6 shows the colon segmentation before and after the straightening procedure is applied to the centerline.

Figure 7:
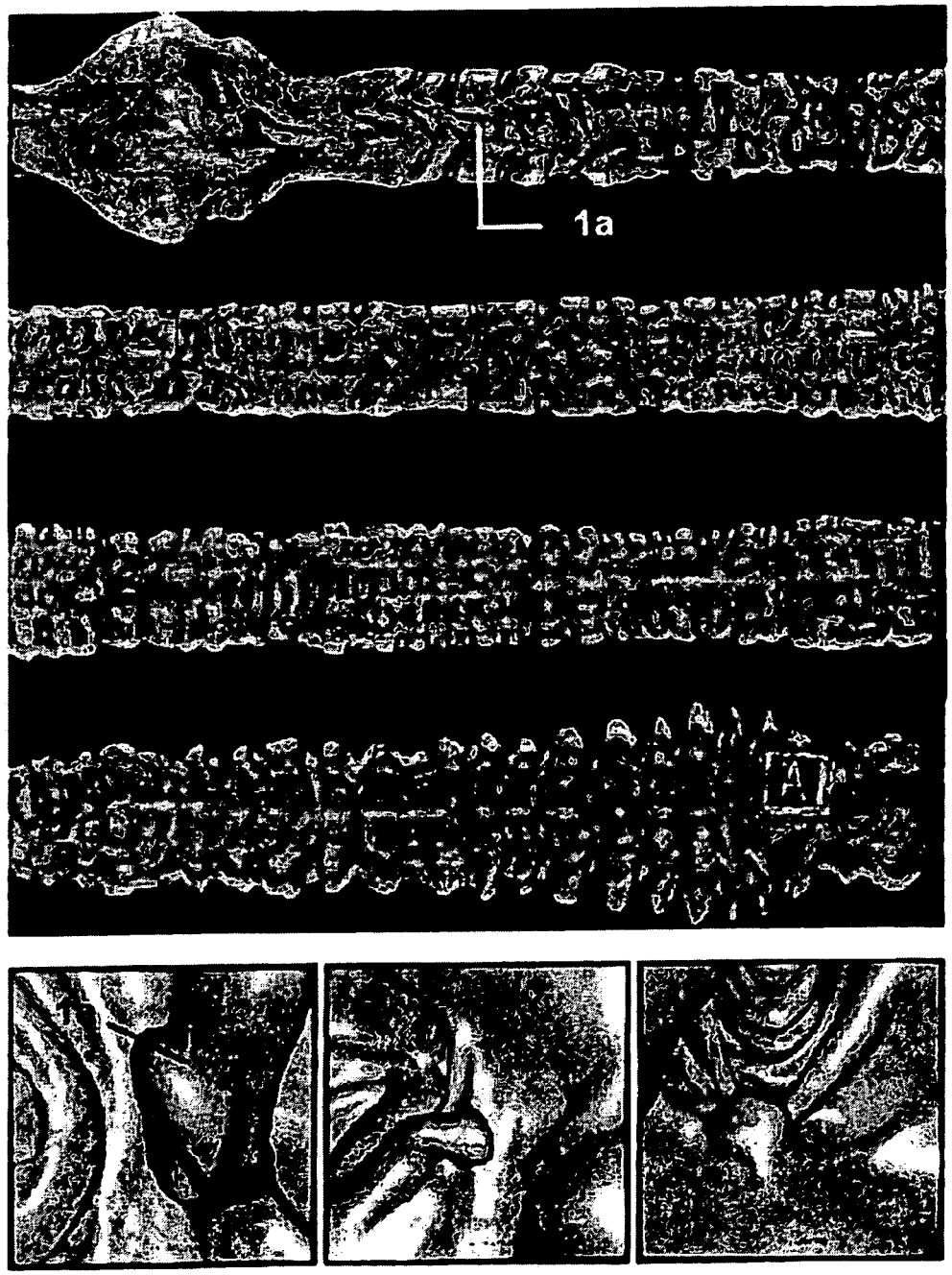
FIG. 7 illustrates strips of the dissection view in accordance with principles of the invention, with lesion (1a) thereon and shows in the lower part of the figure the locations thereof on the endoluminal view.

FIG. 7 illustrates the result of a virtual dissection of a well extended colon. The texture image is split into four sections, starting at the rectum in the top left corner and ending up at the cecum in the bottom right. It illustrates the appearance of lesions (1a) in the dissection view and the corresponding findings in the endoluminal view. These lesions tend to appear stretched out horizontally along the longitudinal axis consistent with the conclusion of a recent study, while Haustral folds tend to appear perpendicular to the long axis of the colon. See the afore-cited work by Johnson K. Johnson C, Fletcher J. MacCarty R. Summers R. CT colonography using 360-degree virtual dissection: a feasibility study. AJR Am J Roentgenol; 186:90-95, (2006).

As stated with regard to FIG. 7, lesions (1a) in the dissection view appear in corresponding locations on the endoluminal view. A result of the present technique is the long dimension of the image used to display the flattened image. Table 1 lists the computation times for the major steps of the dissection algorithm for different image resolutions. The tests were performed on a 2.39 GHz Pentium processor with 2 GB of RAM.

TABLE 1

COLON DISSECTION COMPUTATION TIMES FOR DIFFERENT IMAGE RESOLUTIONS (IN SECONDS)

| Image resolution | Distance map calculation | Colon straightening | Diameters Calculation | Unfolding rendering |
|---|---|---|---|---|
| 4096 × 256 | 1 | 1 | 8 | 28 |
| 2048 × 128 | 1 | 1 | 3 | 7 |

For an accurate interpretation based on a dissection view, it is important that radiologists become familiar with the appearance of normal and abnormal colon features at virtual dissection. The present invention contributes significantly to that end by providing real time point-to-point correlation between the dissection image and the corresponding 3D and 2D images.

With the virtual dissection the whole colon surface can be diagnosed. However, colon lesions which are presented as bulged objects are difficult to detect at first view. The following 3 methods emphasize the height of objects.

If the stripes shown in FIG. 4 are interactively tilted by the user the shades behind lesions change. Since the human perception is sensitive to such changes bulged objects can be easily detected.

The position of the light source can be changed by the user. The angle of the light source influences the position of the shade relative to the object. The distance of the light source from the object affects the form of the shade. The changes in form and position of the shade help the user in detecting the objects of interest.

Contour lines are known from geographic maps in which the heights of mountains are visualized. This information has to be added to the virtual dissection. Herein concentric lines emphasize lesions which can be easily differentiated from elongated structures like haustral folds. The color coding of ranges of similar heights is also a usual method in cartography. This method can be used in virtual dissection as well.

Figure 8B:
FIGS. 8 and 9 show the results of a dissection view computation in accordance with principles of the invention.
Figure 8A:
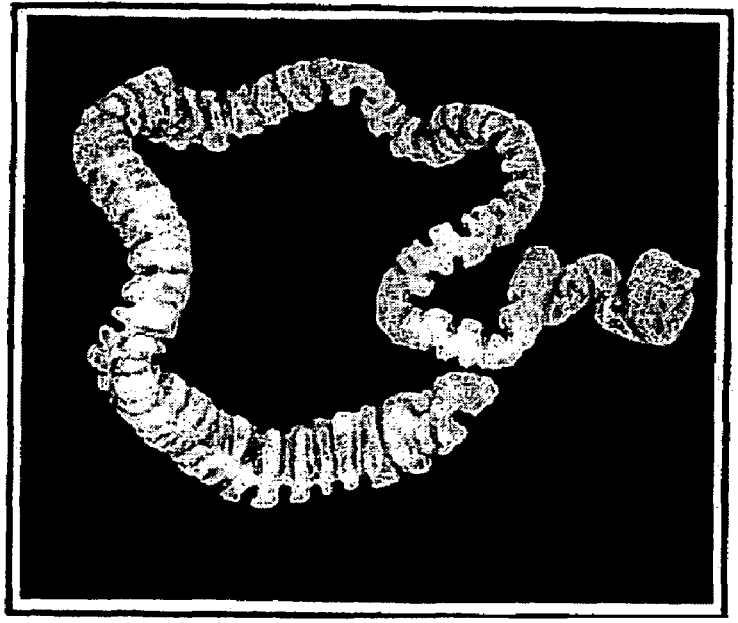
Figure 9:
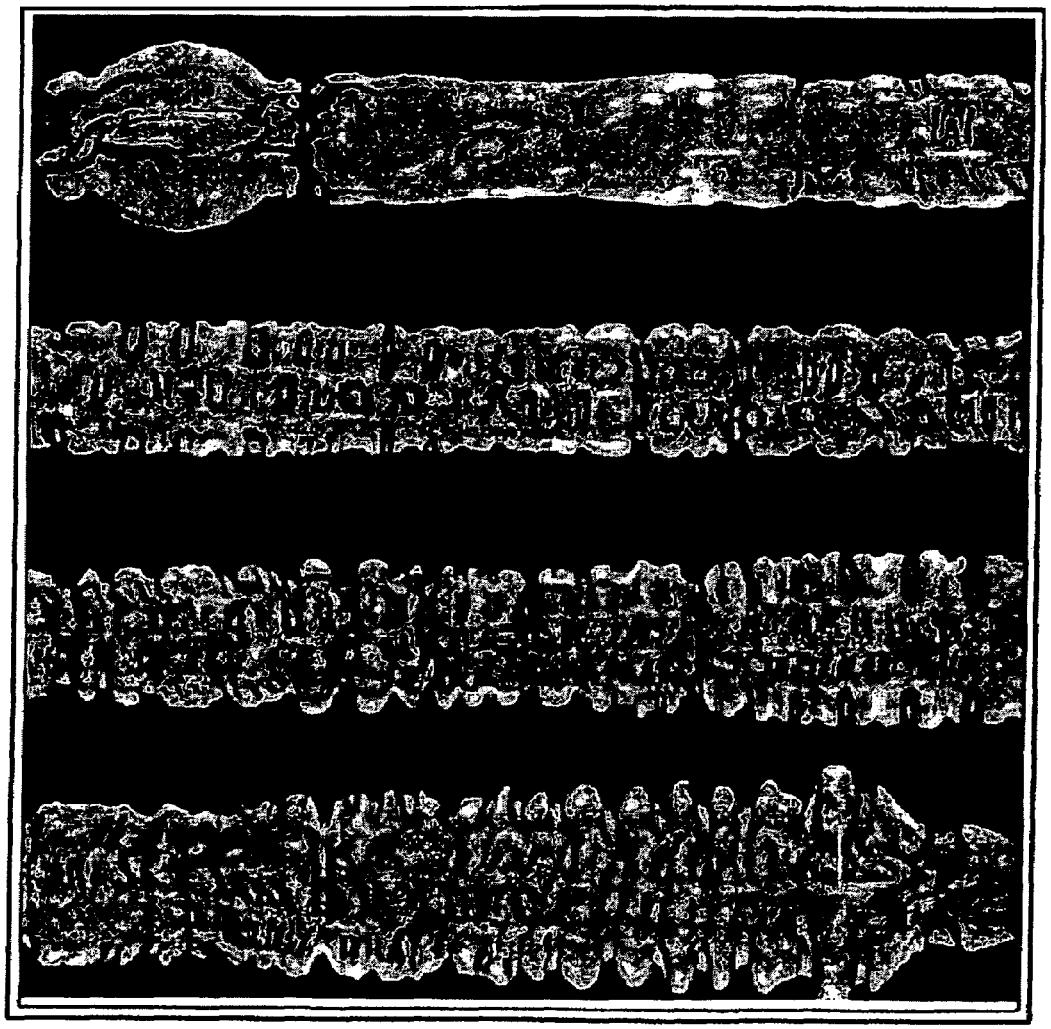

Below we illustrate the results of the dissection view computation. Two examples are presented. The first example is shown in FIGS. 8 and 9. FIG. 8 corresponds to the global view shown in a solid and in a semitransparent texture. FIG. 9 illustrates the corresponding dissection view.

Figure 10B:
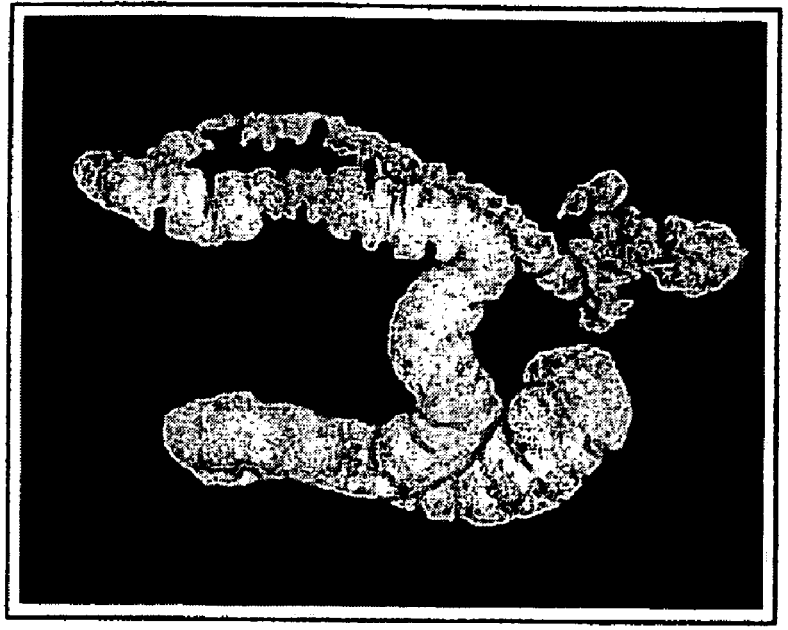
FIGS. 10 and 11 show an example of where a colon was insufficiently distended and as a result, the dissection is incomplete.
Figure 10A:
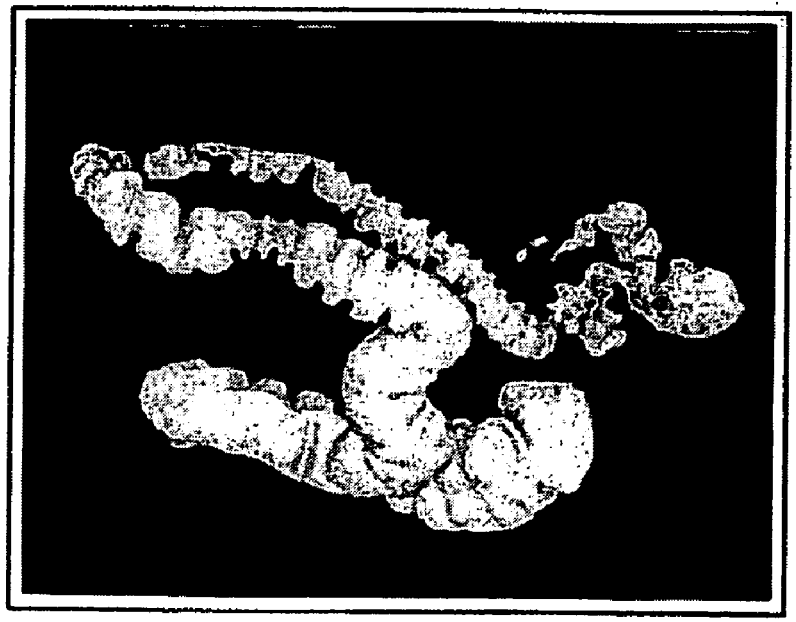
Figure 11:
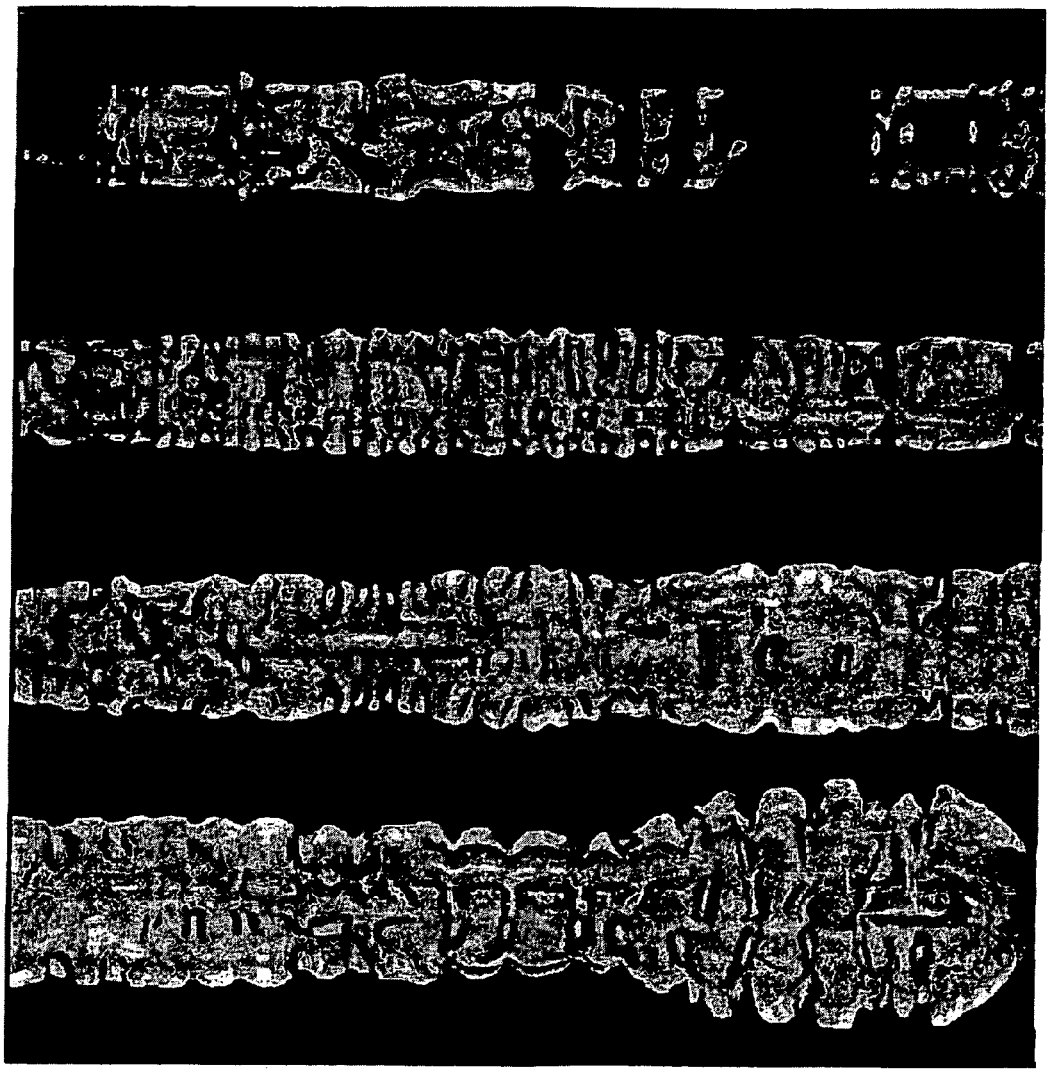

The second example is shown in FIGS. 10 and 11. This example shows an example where the colon was not properly distended and as a result the dissection is incomplete. The area where a gap is found in the dissection view corresponds to the areas where the colon is not well distended.

Figure 12:
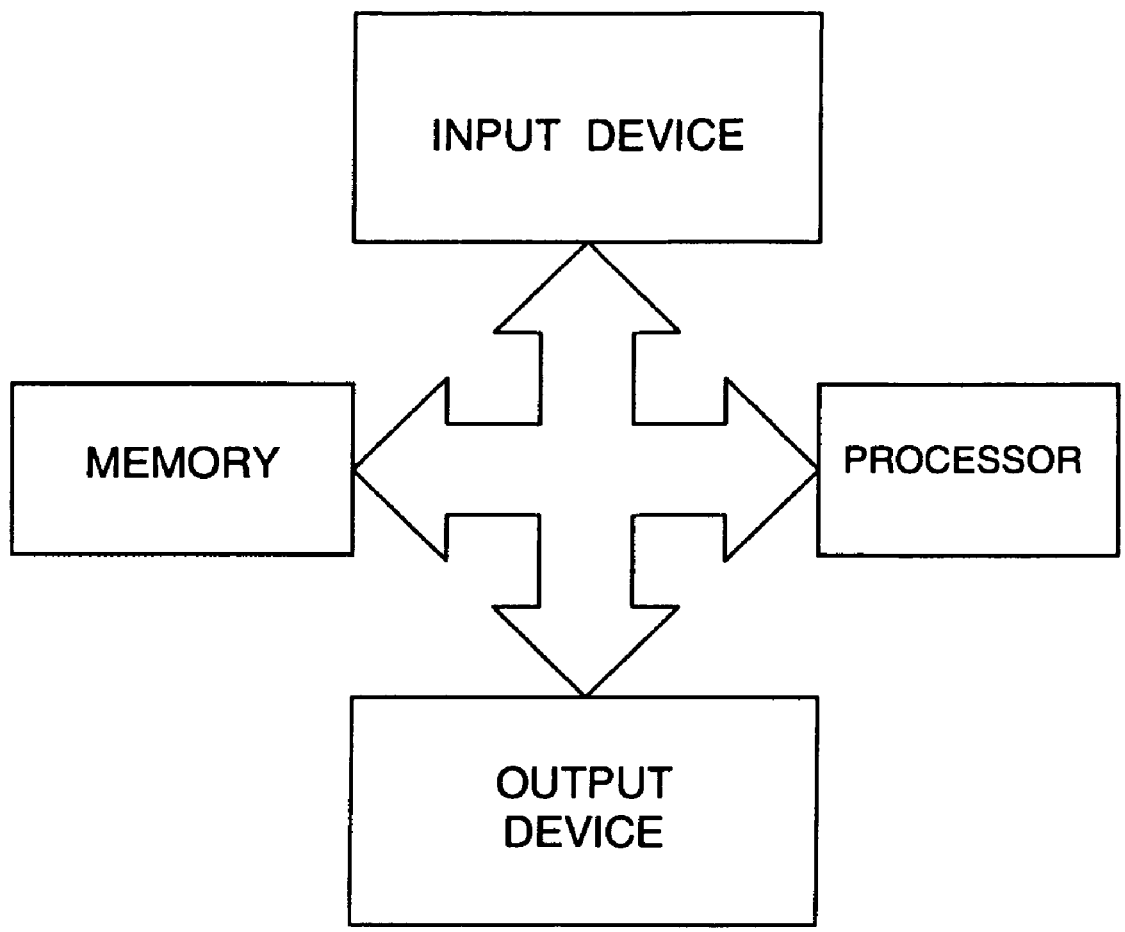
FIG. 12 shows in block schematic form a computer such as may be utilized for implementation of the present invention.

As will be apparent, the present invention for a SYSTEM AND METHOD FOR COLON UNFOLDING VIA SKELETAL SUBSPACE DEFORMATION is intended to be implemented with the use and/or application of imaging equipment in conjunction with a programmed digital computer. FIG. 12 shows in general terms and in basic schematic form a digital processor coupled for two way data communication with an input device, an output device, and a memory device for storing a program and other data. The input device is so designated in broad terms as a device for exchanging data, for example, relating to an image or images, or interactive commands for processing in accordance with the present invention. For example, an input may be from an imaging device, such as a device incorporated in a CATSCAN, X-ray machine, an MRI or other device, or a stored image, or by communication with another computer or device by way of direct connection, a modulated infrared beam, radio, land line, facsimile, or satellite as, for example, by way of the World Wide Web or Internet, or any other appropriate source of such data. The output device may be for data, commands, and/or it may include a computer type display device using any suitable apparatus such as a cathode-ray kinescope tube, a plasma display, liquid crystal display, and so forth, and serve as a user interface as utilized in the described exemplary embodiments, or it may or may not include a device for rendering an image and may include a memory for storing an image, or measurement parameters or commands for further processing, or for viewing or evaluation, as may be convenient, or it may utilize a connection or coupling including such as are noted above in relation to the input device. The processor is operative with a program set up in accordance with the present invention for implementing steps of the invention. Such a programmed computer may interface readily through communications media such as land line, radio, the Internet, and so forth for image data acquisition and transmission.

The invention may be readily implemented, at least in part, in a software memory device and packaged in that form as a software product. This can be in the form of a computer program product comprising a computer useable medium having computer program logic recorded thereon for program code for performing the method of the present invention.

The present invention has also been explained in part by way of examples using illustrative exemplary embodiments. It will be understood that the description by way of exemplary embodiments is not intended to be limiting and that, while the present invention is broadly applicable, it is helpful to also illustrate its principles, without loss of generality, by way of exemplary embodiments relating to an important field of application for the present invention, namely, to computer vision and imaging. For example, the described embodiments typically illustrate operation in real time, this being generally a preferred mode of operation.

More particularly, it is noted that the present invention can also find application in the examination of other organs exhibiting a similar structure where examination of interior walls may be desirable, such as in other parts of the stomach and intestinal portions, the trachea, and so forth. It is also noted that the invention is applicable to industrial structures of generally tubular or cavernous forms such as, for example, pipelines, solar heat exchangers, well casings, cupolas, castings and the like.

It will also be understood that various changes and substitutions not necessarily herein explicitly described may be made without departing from the spirit and scope of the invention which is defined by the claims following.

What is claimed is:

1. A method for unfolding an image of a colon via skeletal subspace deformation comprising:

deriving a centerline of a segmented image of said colon;

computing a distance map encoding a nearest point of said centerline for each voxel on a wall of said colon;

generating a polyhedral model of a lumen based on said segmented image of said colon;

determining a neighborhood of points on said centerline for each vertex of the polyhedral model based on the distance map, wherein each point in the neighborhood is associated with a weight inversely proportional to a distance between a respective vertex and the centerline points in that neighborhood;

performing a straightening operation on said centerline based on the weighted centerline points for each vertex of the polyhedral model for determining a straighten colon;

performing a dissection image computation based on said straighten colon for deriving a texture image; and displaying said texture image of said straighten colon.

2. The method of claim 1, wherein deriving said centerline of said segmented image comprises deriving a centerline path representing said centerline.

3. The method of claim 2, further comprising defining said centerline path as a sequence of joints, wherein any two consecutive joints define a centerline link segment therebetween and wherein each centerline link segment has a respective associated coordinate system of orthogonal x, y, and z axes, wherein each respective z axis at any particular point is oriented to align with a tangent of said centerline path at that particular point.

4. The method of claim 3, wherein deriving said centerline path comprises utilizing a region growing algorithm starting at a wall of said colon.

5. The method of claim 3,
generating said polyhedral model comprises:
generating a polyhedral mesh model of said surface of said colon based on a given threshold value, said polyhedral model comprising a plurality triangles with vertices, designated as $v_i \ldots v_p$; and
computing an adjacency list for each of said vertices.

6. The method of claim 5, wherein
generating a polyhedral mesh model comprises
a smoothing step
comprising traversing each adjacency list and computing an adjacency list for each of said vertices.

7. The method of claim 6, wherein said smoothing step comprises traversing each adjacency list and adjusting coordinates of said vertices for generating a smooth polyhedral mesh model.

8. The method of claim 5, wherein generating the polyhedral mesh model comprises using a marching cubes algorithm.

9. The method of claim 5, wherein computing said distance map comprises using a region growing technique based on the pseudo Euclidean distance transform wherein points that define said centerline are used as seed points.

10. The method of claim 9, including:
associating each of said vertices $v_i$ with its respective closest point $c_k$ on said centerline path as defined by said distance map; and
iterating through said adjacency list a plural number of times and each time reassigning for each vertex a new point on said centerline path that corresponds to the preceding average of its neighbors.

11. The method of claim 10, further comprising:
associating each of said vertices v, with its respective closest point $c_k$ on said centerline path as defined by said distance map; and a smoothing step comprising, for each of said vertices $v_i$, averaging its nearest centerline point index k with indices of its adjacent vertices using a plurality of iterations, such that each vertex $v_i$ is associated with a neighborhood of centerline points distributed around its respective closest point $c_k$ on said centerline path, with weights inversely proportional to distance between said vertex $v_i$ and centerline points $c_j$ in said neighborhood.

12. The method of claim 11, further comprising:
aligning each centerline link segment with respect to its preceding link segment to form a straight line therewith by a series of transformations of said respective associated coordinate system of each centerline link segment to a new respective associated coordinate system; and
recomputing coordinates for said vertices based on said transformations.

13. The method of claim 12, wherein
performing said dissection computation derives said texture image of a specified size having a given number of columns by a given number of rows multiplied by a given number of stripes; and
wherein performing said dissection computation comprises partitioning said straightened colon into a plurality of substantially similar length sections.

14. The method of claim 13, further comprising casting, from discrete points along said centerline path, a plurality of rays orthogonal to said centerline path and calculating said intersection of respective rays with said polyhedron, wherein said number of said discrete points corresponds to said number of columns in said texture image.

15. The method of claim 14, further comprising deriving colon diameters at each of said discrete points and utilizing said diameters to scale a process of unfolding each column.

16. The method of claim 15, wherein, once said diameters are derived, a new set of rays are cast orthogonal to said centerline path and uniformly distributed covering an angle in excess of 360 degrees, such that a resulting texture image exhibits an overlap at its edges.

17. The method of claim 16, further comprising utilizing properties of said material being imaged and an effect of scene lighting, and calculating shading for each corresponding pixel of said texture image.

18. A system for unfolding an image of a colon via skeletal subspace deformation comprising:
a memory device for storing a program and other data; and
a processor in communication with said memory device, said processor being operative with said program to perform:
deriving a centerline of a segmented image of said colon;
computing a distance map encoding a nearest point of said centerline for each voxel on a wall of said colon;
generating a polyhedral model of a lumen based on said segmented image of said colon;
determining a neighborhood of points on said centerline for each vertex of the polyhedral model based on the distance map, wherein each point in the neighborhood is associated with a weight inversely proportional to a distance between a respective vertex and the centerline points in that neighborhood; and
performing a straightening operation on said centerline based on the weighted centerline points for each vertex of the polyhedral model for determining a straighten colon.

19. A non-transitory computer program product comprising a computer useable medium having computer program logic recorded thereon for program code for unfolding an image of a colon via skeletal subspace deformation by:
deriving a centerline of a segmented image of said colon;
computing a distance map encoding a nearest point of said centerline for each voxel on a wall of said colon
generating a polyhedral model of a lumen based on said segmented image of said colon;
determining a neighborhood of points on said centerline for each vertex of the polyhedral model based on the distance map, wherein each point in the neighborhood is associated with a weight inversely proportional to a distance between a respective vertex and the centerline points in that neighborhood; and
performing a straightening operation on said centerline based on the weighted centerline points for each vertex of the polyhedral model for determining a straighten colon.

\* \* \* \* \*